United States Patent
Zhang et al.

(10) Patent No.: US 10,692,387 B2
(45) Date of Patent: Jun. 23, 2020

(54) METHOD AND DEVICE FOR SETTING A FLIGHT ROUTE

(71) Applicant: SZ DJI TECHNOLOGY CO., LTD., Shenzhen (CN)

(72) Inventors: Zhiyuan Zhang, Shenzhen (CN); Ye Tao, Shenzhen (CN); Guodong Zhu, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 320 days.

(21) Appl. No.: 15/493,452

(22) Filed: Apr. 21, 2017

(65) Prior Publication Data
US 2017/0221368 A1  Aug. 3, 2017

Related U.S. Application Data

(63) Continuation of application No. PCT/CN2014/089216, filed on Oct. 22, 2014.

(51) Int. Cl.
*G08G 5/00* (2006.01)
*G05D 1/10* (2006.01)
(Continued)

(52) U.S. Cl.
CPC .......... *G08G 5/0039* (2013.01); *B64D 43/00* (2013.01); *G01C 23/005* (2013.01); *G05D 1/101* (2013.01);
(Continued)

(58) Field of Classification Search
CPC ... B64C 2201/14; B64C 39/024; B64D 43/00; G01C 23/005; G01C 21/367;
(Continued)

(56) References Cited

U.S. PATENT DOCUMENTS 6,115,669 A * 9/2000 Watanabe .......... G01C 21/3614
340/988
8,352,169 B2 * 1/2013 Coulmeau .............. G05D 1/101
701/120
(Continued)

FOREIGN PATENT DOCUMENTS

CN       102436351 A    5/2012
CN       102566580 A    7/2012
(Continued)

OTHER PUBLICATIONS

Fu-Sheng Qiu et al., Development of the UAV route planning software based on GIS, Journal of Shenyang Aerospace University, Apr. 2014, 4 pages, vol. 31, No. 2.
(Continued)

*Primary Examiner* — Angelina Shudy
(74) *Attorney, Agent, or Firm* — Anova Law Group, PLLC

(57) ABSTRACT

A method and a device for setting a flight route are provided. The method comprises acquiring route data of an aerial vehicle, determining waypoint coordinates in the route data, configuring a route display interface according to maximum distances between the determined waypoint coordinates, displaying a route of the aerial vehicle in the configured route display interface according to waypoint coordinates in the route data, and resetting the route displayed in the route display interface according to edit information corresponding to a received edit operation to obtain updated route data of the aerial vehicle.

16 Claims, 11 Drawing Sheets

(51) Int. Cl.
*B64D 43/00* (2006.01)
*G01C 23/00* (2006.01)

(52) U.S. Cl.
CPC ........... G08G 5/006 (2013.01); G08G 5/0021 (2013.01); G08G 5/0034 (2013.01); *B64C 2201/14* (2013.01)

(58) Field of Classification Search
CPC .... G05D 1/101; G08G 5/0021; G08G 5/0034; G08G 5/0039; G08G 5/006
USPC ........................................................ 701/467
See application file for complete search history.

(56) References Cited

U.S. PATENT DOCUMENTS

| | | | | |
|---|---|---|---|---|
| 10,240,944 | B2* | 3/2019 | Santilli | G01C 21/3697 |
| 2004/0104824 | A1 | 6/2004 | Cole et al. | |
| 2005/0046615 | A1* | 3/2005 | Han | G01C 21/36 |
| | | | | 342/357.31 |
| 2006/0224311 | A1* | 10/2006 | Watanabe | G01C 21/3635 |
| | | | | 701/532 |
| 2008/0004756 | A1 | 1/2008 | Hedrick | |
| 2009/0063048 | A1* | 3/2009 | Tsuji | G01C 21/30 |
| | | | | 701/455 |
| 2009/0082952 | A1* | 3/2009 | Narita | B60W 40/12 |
| | | | | 701/533 |
| 2009/0083659 | A1* | 3/2009 | Tatehata | G01C 21/367 |
| | | | | 715/784 |
| 2009/0125163 | A1* | 5/2009 | Duggan | G05D 1/0061 |
| | | | | 701/2 |
| 2009/0198767 | A1* | 8/2009 | Jakobson | G01C 21/3679 |
| | | | | 709/203 |
| 2011/0010082 | A1* | 1/2011 | Wilson | G01C 23/00 |
| | | | | 701/532 |
| 2012/0242513 | A1* | 9/2012 | Oguchi | G01M 17/0074 |
| | | | | 340/995.27 |
| 2012/0274515 | A1* | 11/2012 | Theilgaard | G01S 5/30 |
| | | | | 342/463 |
| 2015/0178572 | A1* | 6/2015 | Omer | G08G 1/0112 |
| | | | | 382/108 |
| 2016/0050840 | A1* | 2/2016 | Sauder | A01B 79/005 |
| | | | | 701/3 |
| 2016/0138933 | A1* | 5/2016 | Yamaguchi | G01C 21/3635 |
| | | | | 701/532 |
| 2016/0297545 | A1* | 10/2016 | Yang | G08C 17/02 |
| 2016/0321950 | A1* | 11/2016 | McQuistan | G06F 16/252 |
| 2017/0017235 | A1* | 1/2017 | Tanaka | G05D 1/0027 |
| 2017/0287214 | A1* | 10/2017 | Anderson | G06T 19/003 |
| 2018/0038710 | A1* | 2/2018 | Shang | G01C 21/26 |

FOREIGN PATENT DOCUMENTS

| | | |
|---|---|---|
| CN | 102582826 A | 7/2012 |
| CN | 102800048 A | 11/2012 |
| CN | 102854886 A | 1/2013 |
| CN | 103488179 A | 1/2014 |
| CN | 103809600 A | 5/2014 |
| CN | 103856667 A | 6/2014 |
| CN | 103858084 A | 6/2014 |
| CN | 104035446 A | 9/2014 |

OTHER PUBLICATIONS

Yi-Ming Wu et al., The Design and Realization of UAV Track System Based on GIS, Journal of Projectiles, Rockets, Missiles and Guidance, 2006, pp. 1056-1058.

Wengang Huang et al., UAV Path Planning Based on Improved Sparse A* Search Algorithm, Journal of Telemetry Track and Command, Nov. 2012, 5 pages, vol. 33, No. 6.

The World Intellectual Property Organization (WIPO) International Search Report for PCT/CN2014/089216 dated Jul. 20, 2015 5 Pages.

Wei, Hui et al., Aerocraft Track Display Based on Image Processing, Computer Engineering and Design, Feb. 28, 2013, pp. 611-615, vol. 34, No. 2.

* cited by examiner

METHOD AND DEVICE FOR SETTING A FLIGHT ROUTE

CROSS-REFERENCE TO RELATED APPLICATION

This is a continuation application of International Application No. PCT/CN2014/089216, filed on Oct. 22, 2014, the entire contents of which are incorporated herein by reference.

TECHNICAL FIELD

The present disclosure relate to the field of flight technologies, in particular to a method and device for setting a flight route.

BACKGROUND

An aerial vehicle, such as an unmanned aerial vehicle (UAV) capable of flying by remote controlling, can be controlled to reach many locations where human beings could not reach, to perform tasks such as filming or detecting a special region or from a particular angle or the like.

Currently, a flight of an aerial vehicle may be controlled manually or automatically. With the manual control, a user may control the aerial vehicle to fly in a certain region using an apparatus such as a remote controller. With the automatic control, the user may input one or more GPS coordinates using an apparatus such as a remote controller, to control the aerial vehicle to automatically pass by locations of these GPS coordinate values one after another in the course of flight.

For the manual control, the user needs to pay attention to a status of the aerial vehicle at any moment, otherwise it is possible that a flight accident occurs or a specified flight task cannot be completed. This is time and effort consuming. For the automatic control, inputted data could not be fed back to the user intuitively. As a result, the user may not know whether a fight task controlled based on the inputted data is accurate or reasonable, and thus the user's time may be wasted.

SUMMARY

The embodiments of the present disclosure provide a method and device for setting a flight route capable of configuring automatically a route display interface for a user to configure a certain route.

In one aspect of the present disclosure, there is provided a flight route setting method comprising acquiring route data of an aerial vehicle comprising waypoint coordinates of waypoints on a route, displaying the route of the aerial vehicle in a route display interface zoomed at a zoom ratio according to the waypoint coordinates, and resetting the route displayed in the route display interface according to an edit operation to obtain updated route data of the aerial vehicle.

In some embodiments, the method further comprises configuring the zoom ratio, comprising calculating a first maximum planar distance between the waypoints in a first direction in a planar coordinate system, calculating a second maximum planar distance between the waypoints in a second direction in the planar coordinate system, and calculating the zoom ratio according to a screen coordinate of a screen showing the route display interface, and the first and second maximum planar distances.

In some embodiments, resetting the route comprises detecting the edit operation, and detecting, if the edit operation instructs to update one of the waypoints to a target position, whether the target position is within a no-fly zone. If yes, resetting the route further comprises issuing a prompt of forbidding to set. If no, resetting the route further comprises resetting the route displayed in the route display interface according to the edit operation.

In some embodiments, acquiring the route data comprises acquiring a geometric figure drawn on a planar map, calculating slopes corresponding to position points on the geometric figure, determining two or more of the position points on the geometric figure as the waypoints on the route, and obtaining the route data according to coordinates of the two or more of the position points. The two or more of the position points comprise a start point of the geometric figure and a position point having a corresponding slope greater than a preset slope threshold and a distance to a previous position point no less than a preset distance threshold.

In some embodiments, the method further comprises, before calculating the slopes, judging whether the geometric figure is a straight line. If yes, the method further comprises determining a start point and an end point of the straight line as the waypoints on the route and obtaining the route data according to coordinates of the start point and the end point. If no, the method further comprises calculating the slopes corresponding to the position points on the geometric figure.

In some embodiments, the route display interface is a three-dimensional route display interface, and displaying the route comprises displaying the route in the three-dimensional route display interface with preset waypoint heights of the waypoints according to the waypoint coordinates. The preset waypoint heights are preset according to altitudes of corresponding regions on the route or preset height values from a ground.

In some embodiments, if the edit operation instructs to perform a waypoint height editing, resetting the route comprises recording heights of the aerial vehicle when the aerial vehicle flies to the waypoints and resetting the route displayed in the route display interface using the recorded heights of the waypoints to obtain the updated route data of the aerial vehicle.

In some embodiments, the method further comprises controlling a display of the route in response to a user operation. The controlling comprises one of performing a three-dimensional zooming operation on the route in response to a gesture of two-finger pinching, moving the route in response to a gesture of single-finger dragging on a central region of the route display interface, flipping the route in response to a gesture of single-finger dragging on a periphery region of the route display interface, and entering into an edit mode to edit a waypoint in response to a single-finger click on the waypoint.

In some embodiments, the edit operation comprises at least one of adjusting a distance of a selected waypoint in a direction facing a screen by two-finger pinching, moving a position of the selected waypoint up and down or left and right by a gesture of singer-finger dragging, moving an unselected waypoint to a center of the route display interface for editing by single-finger clicking on the unselected waypoint, saving a previous editing by clicking on a confirm button, or cancelling the previous editing by clicking on a cancel button.

In some embodiments, the method further comprises at least one of saving the updated route data of the aerial vehicle or incorporating the updated route data of the aerial vehicle into a map for displaying.

In some embodiments, the method further comprises controlling, when a flight control operation is detected, the aerial vehicle to fly automatically in accordance with the updated route data.

In another aspect of the present disclosure, there is provided a flight route setting device comprising a processor, a communication device coupled to the processor and configured to communicate with an external device, and a memory coupled to the processor and the communication device. The memory stores instructions that, when executed by the processor, cause the processor to acquire route data of an aerial vehicle comprising waypoint coordinates of waypoints on a route, display the route of the aerial vehicle in a route display interface zoomed at a zoom ratio according to the waypoint coordinates, and reset the route displayed in the route display interface according to an edit operation to obtain updated route data of the aerial vehicle.

In some embodiments, the instructions further cause the processor to calculate a first maximum planar distance between the waypoints in a first direction in a planar coordinate system, calculate a second maximum planar distance between the waypoints in a second direction in the planar coordinate system, and calculate the zoom ratio according to a screen coordinate of a screen showing the route display interface, and the first and second maximum planar distances.

In some embodiments, the instructions further cause the processor to detect the edit operation and, if the edit operation instructs to update one of the waypoints to a target position, detect whether the target position is within a no-fly zone, issue a prompt of forbidding to set if the target position is within the no-fly zone, and reset the route displayed in the route display interface according to the edit operation if the target position is not within the no-fly zone.

In some embodiments, the instructions further cause the processor to acquire a geometric figure drawn on a planar map, calculate slopes corresponding to position points on the geometric figure, determine two or more of the position points on the geometric figure as the waypoints on the route, and obtain the route data according to coordinates of the two or more of the position points. The two or more of the position points comprise a start point of the geometric figure and a position point having a corresponding slope greater than a preset slope threshold and a distance to a previous position point no less than a preset distance threshold.

In some embodiments, the instructions further cause the processor to judge whether the geometric figure is a straight line. If the geometric figure is a straight line, the instructions further cause the processor to determine a start point and an end point of the straight line as the waypoints on the route, and obtain the route data according to coordinates of the start point and the end point. If the geometric figure is not a straight line, the instructions further cause the processor to calculate the slopes corresponding to the position points on the geometric figure.

In some embodiments, the route display interface is a three-dimensional route display interface. The instructions further cause the processor to display the route in the three-dimensional route display interface with preset waypoint heights of the waypoints according to the waypoint coordinates. The preset waypoint heights are preset according to altitudes of corresponding regions on the route or preset heights from a ground.

In some embodiments, if the edit operation instructs to perform a waypoint height editing, the instructions further cause the processor to record heights of the aerial vehicle when the aerial vehicle flies to the waypoints, and reset the route displayed in the route display interface using the recorded heights of the waypoints to obtain the updated route data of the aerial vehicle.

In some embodiments, the instructions further cause the processor to save the updated route data of the aerial vehicle and incorporate the updated route data of the aerial vehicle into a map for displaying.

In some embodiments, the instructions further cause the processor to control the aerial vehicle to fly automatically in accordance with the updated route data when a flight control operation is detected.

According to the present disclosure, an interface for displaying a route for a user may be automatically configured and an edit function for the route may be provided to the user. The interface may intuitively and completely display route information to the user. As a result, the user's time can be saved and the needs to automate and intelligentize route viewing and editing can be satisfied.

DETAILED DESCRIPTION OF THE EMBODIMENTS

The technical solutions of the present disclosure will be described in detail below in combination with the drawings in the embodiments of the present disclosure. It should be appreciated that embodiments described herein are only some rather than all of the embodiments of the present disclosure. All other embodiments obtained by those having ordinary skills in the art on the basis of the embodiments of the present disclosure without any inventive efforts should fall within the scope of the present disclosure.

According to the present disclosure, a route display interface may be automatically configured after acquiring route data, and the acquired route data may be intuitively and completely displayed in the route display interface. Further, an edit operation may be received from a user to edit a route.

Figure 1:
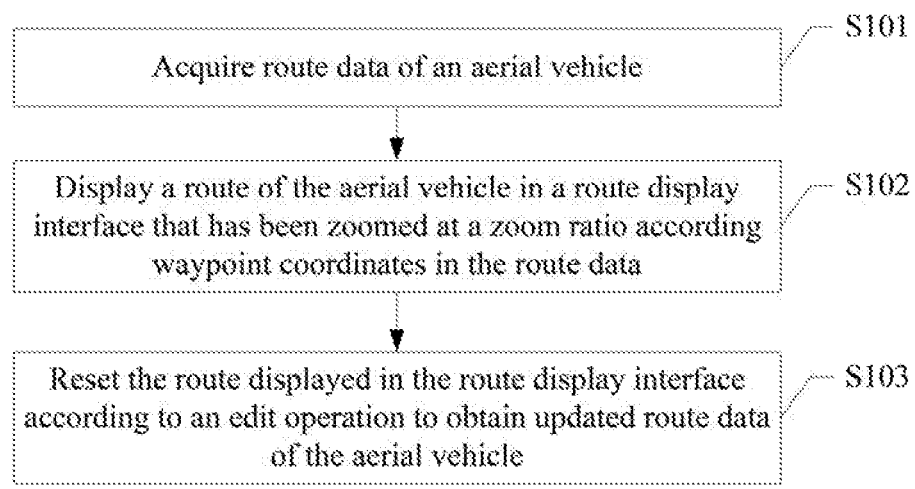
FIG. 1 is a schematic flow chart of a method for setting a route for an aerial vehicle in accordance with an embodiment of the present disclosure.

FIG. 1 is schematic flow chart of a method for setting a route for an aerial vehicle in accordance with an embodiment of the present disclosure. The method in accordance with the present disclosure may be implemented in an intelligent terminal such as a smart phone, a tablet, an intelligent wearable apparatus, a computer, or the like. The method shown in FIG. 1 will be described in detail below.

S101: acquiring route data of the aerial vehicle.

The route data may comprise at least coordinates of waypoints on the route, also referred to as "waypoint coordinates." The route data may further comprise other data such as time values and heights of the waypoints, also referred to as "waypoint time values" and "waypoint heights," respectively.

The route data may comprise route data configured directly by a user, or may comprise route data that has been generated in the course of fight when the aerial vehicle is controlled to perform a certain flight task. That is, acquiring route data of the aerial vehicle may comprise acquiring the coordinates, heights, and time values of various waypoints of the aerial vehicle in the course of flight as the route data of the aerial vehicle. In some embodiments, the route data may comprise route data associated with the aerial vehicle that is downloaded from another terminal or a network.

S102: displaying a route of the aerial vehicle in a route display interface that has been zoomed at a zoom ratio according to the waypoint coordinates in the route data.

In some embodiments, the zoom ratio of the route display interface may be configured according to distances between various waypoints in the route data, so as to display the entire route corresponding to the route data in the route display interface, so that the user does not need to perform an extra screen-scrolling operation.

In some embodiments, the zoom ratio may be determined according to maximum distances between various waypoints in an X axis direction and a Y axis direction in a horizontal plane, respectively, and sizes of a screen area of the terminal required by the route display interface in the X axis and the Y axis, so that two waypoints with the largest distance in the X axis direction and two waypoints with the largest distance in the Y axis direction in the route data may both be displayed in the screen area corresponding to the route display interface.

In some embodiments, in S102, the route corresponding to the aerial vehicle may be displayed with the waypoints being connected by lines according to the time values of the waypoints.

S103: resetting the route displayed in the route display interface according to an edit operation to obtain updated route data of the aerial vehicle.

The user may click on a certain waypoint displayed in the route display interface that needs to be edited, to invoke an edit window for the waypoint and complete the editing in the edit window. In some embodiments, the user can directly drag the certain waypoint in the route display interface, thereby allowing an actual position coordinate of the waypoint be modified according to a dragging distance, a dragging direction, and the above-mentioned zoom ratio.

After the updating in S103 is completed, the updated route data may be displayed to the user in the mute display interface in real time.

According to the present disclosure, an interface for displaying a route may be automatically configured for a user, and a route edit function can be provided to the user. Thus, route information can be intuitively and completely displayed to the user. As a result, the user's time can be saved and the needs to automate and intelligentize route viewing and editing can be satisfied.

Figure 2:
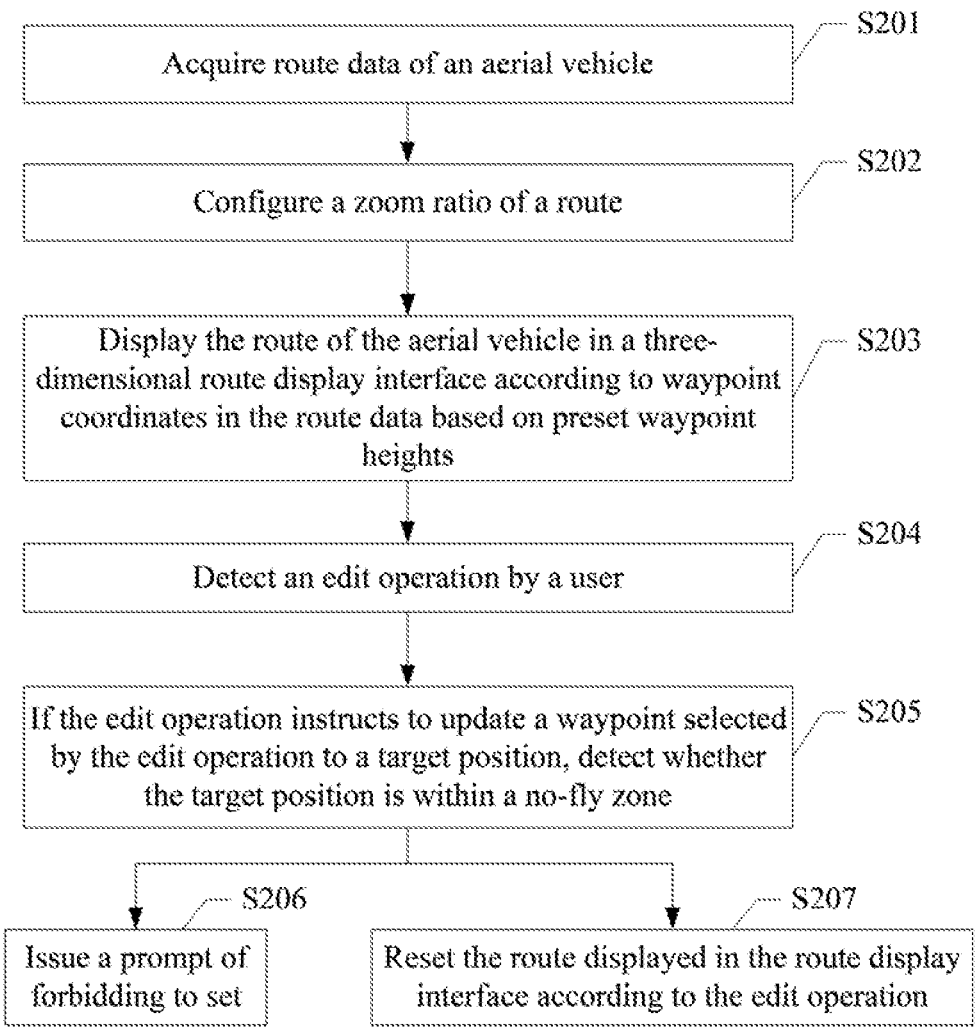
FIG. 2 is a schematic flow chart of another method for setting a flight route in accordance with an embodiment of the present disclosure.

FIG. 2 is a schematic flow chart of another method for setting a flight route in accordance with an embodiment of the present disclosure. The method in accordance with the present disclosure may be implemented in an intelligent terminal such as a smart phone, a tablet, an intelligent wearable apparatus, a computer, or the like. The method shown in FIG. 2 will be described in detail below.

S201: acquiring route data of an aerial vehicle.

In some embodiments, the route data can be obtained by acquiring a geometric figure drawn by a user on a planar map. More details on obtaining the route data are described below with reference to FIG. 4.

S202: configuring a zoom ratio of a route.

In some embodiments, configuring the zoom ratio may comprise determining waypoint coordinates in the route data and configuring a route display interface according to a maximum distance among the determined waypoints.

In some embodiments, the waypoint coordinates may comprise GPS coordinates of the waypoints determined from the geometric figure drawn by the user on the above-described planar map. Configuring the zoom ratio may further comprise determining the waypoint coordinates in the route data and calculating maximum planar distances between the waypoints in both directions in a planar coordinate system, respectively. The maximum planar distances may comprise maximum distances in an X axis direction and a Y axis direction in the planar coordinate system, respectively. Configuring the zoom ratio may further comprise calculating a preset zoom ratio of the route display interface according to a screen coordinate of the current terminal (a screen size of a smart phone, a tablet, or the like) and the maximum planar distances in the two directions, and configuring the route display interface according to the calculated zoom ratio. In some embodiments, the route display interface may comprise a three-dimensional route display interface.

S203: displaying the route of the aerial vehicle in the three-dimensional route display interface according to the waypoint coordinates in the route data based on preset waypoint heights.

The waypoint heights may be preset according to altitudes of corresponding regions of the geometric figure drawn on the planar map. That is, when the route data is converted from a two-dimensional planar coordinate system to the three-dimensional route display interface, the waypoint heights may be obtained according to a local altitude (preset or determined by automatic search) based on relative positions of planes of various waypoints, and thus a route in a three-dimensional space can be determined, making it convenient for the user to further update. In some embodiments, the waypoint heights are preset heights from the ground that are safe fight heights set in advance, such as 2 m from the ground. During fight, the aerial vehicle may determine heights from the ground at various positions on the route by a distance sensor, such as an ultrasonic wave sensor.

S204: detecting an edit operation by the user.

After the route is displayed on the three-dimensional route display interface, the user may initiate the edit operation by a specified gesture to edit the route data.

In some embodiments, the edit operation for the route displayed in the route display interface may comprise at least one of the following: adjusting a distance of a waypoint in a direction facing the screen by pinching two fingers, moving a position of a waypoint up and down or left and right by a gesture of single-finger dragging, moving an unselected waypoint to a center of the screen for editing by clicking on the unselected waypoint using a single finger, saving a previous editing by clicking on a confirm button, or cancelling the previous editing by clicking on a cancel button.

S205: if the edit operation instructs to update a waypoint selected by the edit operation to a target position, detecting whether the target position is within a no-fly zone.

If the user moves a position of the waypoint up and down or left and right by clicking on the waypoint using a single finger, the edit operation may be considered as an update operation for the waypoint. Edit information comprising information of updating the waypoint to the target position (to which the user drags the waypoint) may be generated corresponding to the update operation. At this time, if the target position is within the no-fly zone according to a preset no-fly zone, the user may be prompted that the setting could not be performed, and the process in S206, described below, may be performed. For example, it can be judged whether the updated target position is within a no-fly zone of an airport. If yes, the process in S206 is performed to issue a prompt indicating that updating to the target position cannot be completed and the setting is forbidden. If the updated target position is not within a no-fly zone, the process in S207, described below, may be performed. Further, the no-fly zone may also comprise regions within interiors of some tall and big buildings or mountains where a route could not be set.

S206: issuing a prompt of forbidding to set.

S207: resetting the route displayed in the route display interface according to the edit operation.

Further, the method consistent with the present disclosure may comprise performing a view operation for a route (before updating and after updating) displayed in the route display interface, which may comprise displaying the route in response to the user's operation when the route display interface is configured as a route view mode is configured. In some embodiments, displaying the route in response to the user's operation may comprise any one of the following: performing a three dimensional zooming operation for the route by a gesture of two-finger pinching, moving the route up and down or left and right by applying a gesture of single-finger dragging on a central region, flipping the route up and down or left and right by applying a gesture of single finger dragging on a periphery region, and clicking a waypoint by a single finger to enter into an edit mode to perform an edit operation on the waypoint.

In some embodiments, the method in accordance with the present disclosure may also comprise saving the updated route data of the aerial vehicle and/or incorporating the updated route data of the aerial vehicle into a map to display to the user. In some embodiments, edited route data, i.e., the updated route data, may be displayed in a preset two-dimensional or three-dimensional map.

In some embodiments, the method in accordance with the present disclosure may also comprise, when a flight control operation is detected, controlling the aerial vehicle to fly automatically according to time values, waypoint coordinates, and waypoint heights included in the updated route data. The user may send the edited route data to a controller of the aerial vehicle by clicking on one key for the controller to analyze the route data and generate a control instruction to control propulsion components of the aerial vehicle to complete a fight task on the route. In some embodiments, transmitting the route data to the flight controller, analyzing and processing data by the flight controller, and corresponding control operations may be implemented based on existing protocols.

According to the present disclosure, an interface for displaying a route may be automatically configured for a user, and a route edit function can be provided to the user. Thus, route information can be intuitively and completely displayed to the user. As a result, the user's time can be saved and the needs to automate and intelligentize route viewing and editing can be satisfied. Moreover, in the course of editing, some prompts of forbidding to set may be issued automatically to the user, further satisfying the needs to automate and intelligentize route viewing and editing.

Figure 3:
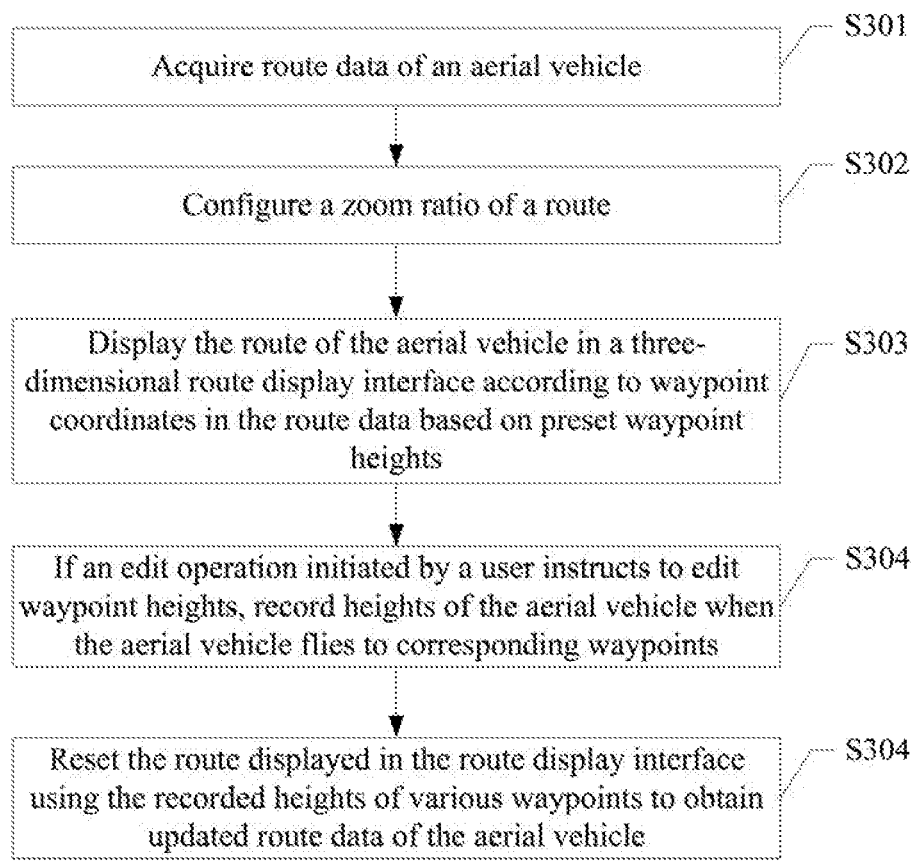
FIG. 3 is a schematic flow chart of still another method for setting a flight route in accordance with an embodiment of the present disclosure.

FIG. 3 is a schematic flow chart of another method for setting a fight route in accordance with an embodiment of the present disclosure. The method in accordance with the present disclosure may be implemented in an intelligent terminal such as a smart phone, a tablet, an intelligent wearable apparatus, a computer, or the like. The method shown in FIG. 3 will be described in detail below.

S301: acquiring route data of an aerial vehicle.

In some embodiments, the route data can be obtained by acquiring a geometric figure drawn by a user on a planar map. More details on obtaining the route data are described below with reference to FIG. 4.

S302: configuring a zoom ratio of a route.

In some embodiments, configuring the zoom ratio may comprise determining waypoint coordinates in the route data and configuring a route display interface according to a maximum distance among the determined waypoints.

In some embodiments, the waypoint coordinates may comprise GPS coordinates of the waypoints determined from the geometric figure drawn by the user on the above-described planar map. Configuring the zoom ratio may further comprise determining the waypoint coordinates in the route data and calculating maximum planar distances between the waypoints in both directions in a planar coordinate system, respectively. The maximum planar distances may comprise maximum distances in an X axis direction and a Y axis direction in the planar coordinate system, respectively. Configuring the zoom ratio may further comprise calculating a preset zoom ratio of the route display interface according to a screen coordinate of the current terminal (a screen size of a smart phone, a tablet, or the like) and the maximum planar distances in the two directions, and configuring the route display interface according to the calculated zoom ratio. In some embodiments, the route display interface may comprise a three-dimensional route display interface.

S303: displaying the route of the aerial vehicle in the three-dimensional route display interface according to the waypoint coordinates in the route data based on preset waypoint heights.

The waypoint heights may be preset according to altitudes of corresponding regions of the geometric figure drawn on the planar map. That is, when the route data is converted from a two-dimensional planar coordinate system to the three-dimensional route display interface, the waypoint heights may be obtained according to a local altitude (preset or determined by automatic search) based on relative positions of planes of various waypoints, and thus a route in a three-dimensional space can be determined, making it convenient for the user to further update. In some embodiments, the waypoint heights are preset heights from the ground that are safe fight heights set in advance, such as 2 m from the ground. During fight, the aerial vehicle may determine heights from the ground at various positions on the route by a distance sensor, such as an ultrasonic wave sensor.

S304: if an edit operation initiated by the user instructs to edit waypoint heights, recording heights of the aerial vehicle when the aerial vehicle flies to corresponding waypoints. That is, it is detected that a trigger instruction to configure waypoint heights is issued in the edit operation performed by the user.

S305: resetting the route displayed in the route display interface using the recorded heights of various waypoints to obtain updated route data of the aerial vehicle.

Thus, through the processes in S304 and S305, after completing the editing of two-dimensional position coordinate points, the user may initiate a configuring operation for heights to complete the editing of a three-dimensional route. In some embodiments, the user may control the aerial vehicle in a semi-automatic control mode, i.e., the aerial vehicle may fly automatically from waypoint to waypoint according to the planar coordinates of the waypoints while the fight heights may be controlled by the user. The aerial vehicle may return a corresponding height when flying to each waypoint. The local terminal may record the returned height and complete a configuration of the heights for the waypoint. Finally, three-dimensional route data comprising planar coordinate positions and heights of the aerial vehicle.

In some embodiments, the method in accordance with the present disclosure may also comprise saving the updated route data of the aerial vehicle and/or incorporating the updated route data of the aerial vehicle into a map to display to the user. In some embodiments, edited route data may be displayed in a preset two-dimensional or three-dimensional map.

In some embodiments, the method in accordance with the present disclosure may also comprise, when a flight control operation is detected, controlling the aerial vehicle to fly automatically according to time values, waypoint coordinates, and waypoint heights included in the updated route data. The user may send the edited route data to a controller of the aerial vehicle by clicking on one key for the controller to analyze the route data and generate a control instruction to control propulsion components of the aerial vehicle to complete a fight task on the route. In some embodiments, transmitting the route data to the flight controller, analyzing and processing data by the flight controller, and corresponding control operations may be implemented based on existing protocols.

According to the present disclosure, an interface for displaying a route may be automatically configured for a user, and a route edit function can be provided to the user. Thus, route information can be intuitively and completely displayed to the user. As a result, the user's time can be saved and the needs to automate and intelligentize route viewing and editing can be satisfied. Moreover, a three-dimensional route may be configured based on actual waypoint heights as needed. As such, a more accurate three-dimensional route configuration may be provided to the user.

Figure 4:
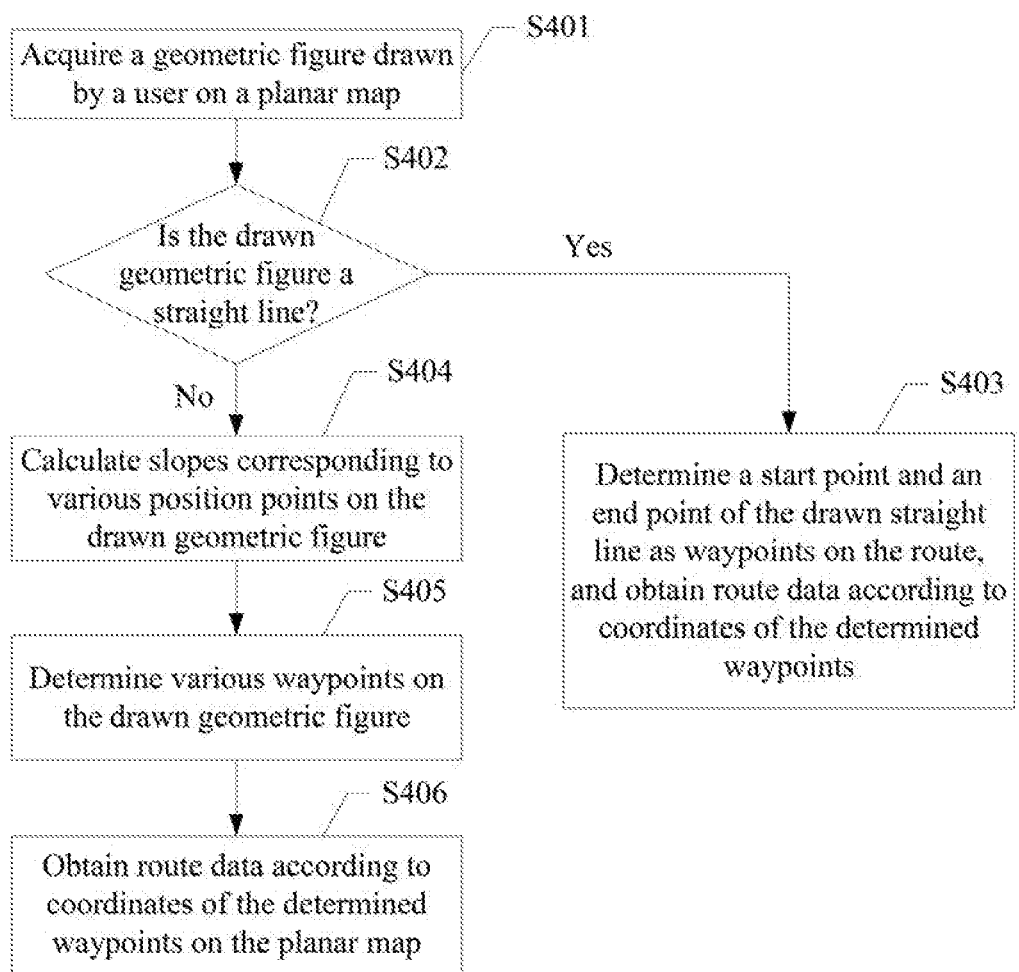
FIG. 4 is a schematic flow chart of a method for acquiring route data in accordance with an embodiment of the present disclosure.

FIG. 4 is a schematic flow chart of a method for acquiring route data according to an embodiment of the present disclosure. The method shown in FIG. 4 will be described in more detail below.

Figure 5:
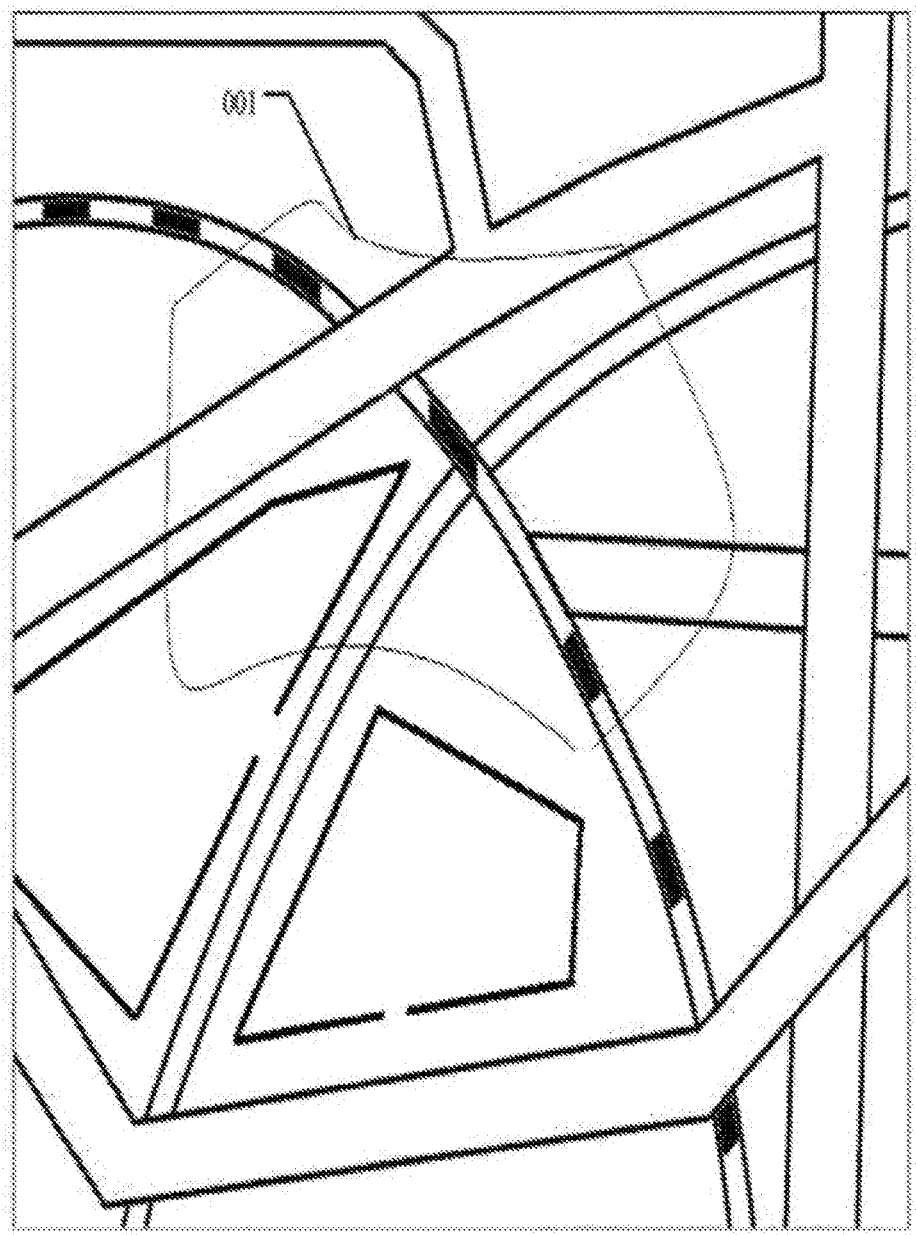
FIG. 5 is a schematic diagram of a drawn route in accordance with an embodiment of the present disclosure.

S401: acquiring a geometric figure drawn by a user on a planar map. The user may draw various figures on the planar map. Such a figure may be a regular geometric figure, such as a straight line, a rectangle, or the like, or an irregular image made of curves. FIG. 5 shows an ellipse-like shape 001 as an example of the geometric figure drawn by the user.

S402: judging whether the drawn geometric figure is a straight line. The aerial vehicle may better perform a straight-line flight task from point to point. Therefore, in some embodiments of the present disclosure, whether a route is a straight line is judged and the following determining processes for waypoints are performed.

S403: if yes, determining a start point and an end point of the drawn straight line as waypoints on the route, and obtaining the route data according to coordinates of the determined waypoints.

S404: if not, calculating slopes corresponding to various position points on the drawn geometric figure.

S405: determining various waypoints on the drawn geometric figure. In some embodiments, the determined waypoints may comprise a start point of the route and position points that have a corresponding slope greater than a preset slope threshold and a distance from a previous waypoint no less than a preset distance threshold.

S406: obtaining the route data according to coordinates of the determined waypoints on the planar map.

Figure 6:
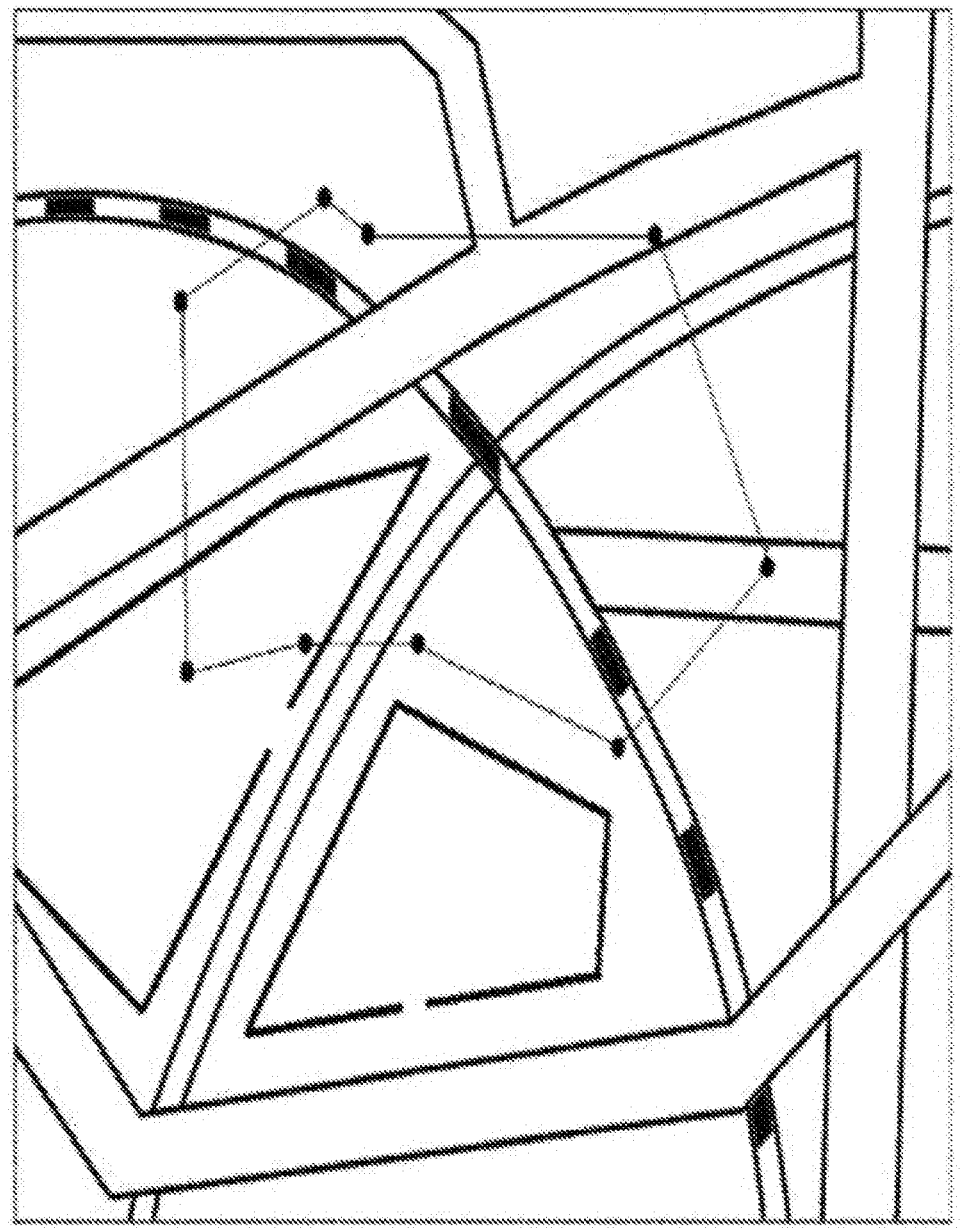
FIG. 6 is a schematic diagram showing a route in accordance with an embodiment of the present disclosure.

A new route that is convenient for the aerial vehicle to fly may be constructed by connecting the determined waypoints in turn (according to a chronological order when the route is drawn). Waypoints after being determined may be displayed in a manner as illustrated in FIG. 6, the route data may be obtained after the user click to confirm.

The route data may mainly include (GPS coordinate data at corresponding positions on the planar map, and may also include other data such as relative time between various waypoints.

The user may draw a flight path on the planar map as needed, while a specific plan for initial waypoints suitable for the aerial vehicle to fly properly may be designed automatically. Subsequently, the user may further perform configurations according to the initial waypoints. As such, an automatic and intelligent route acquiring method is provided while ensuring that the aerial vehicle can fly normally based on a route.

Devices for setting a flight route in accordance with the present disclosure will be described in detail below.

Figure 7:
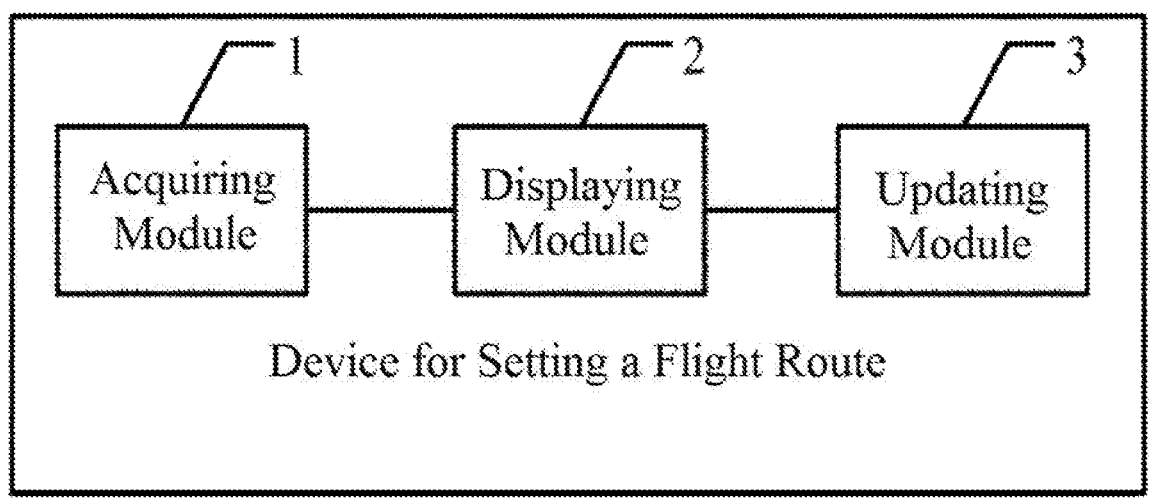
FIG. 7 is a structural schematic diagram of a device for setting a flight route in accordance with an embodiment of the present disclosure.

FIG. 7 is a structural schematic diagram of a device for setting a flight route in accordance with an embodiment of the present disclosure. The device in accordance with the present disclosure may be set in an intelligent terminal such as a smart phone, a tablet, an intelligent wearable apparatus, a computer, or the like. Specifically, the device may comprise an acquiring module 1 configured to acquire route data of an aerial vehicle, a displaying module 2 configured to display a route of the aerial vehicle in a route display interface that has been automatically zoomed at a zoom ratio according to waypoint coordinates in the mute data, and an updating module 3 configured to reset the route displayed in the route display interface according an edit operation to obtain updated route data of the aerial vehicle.

The route data acquired by the acquiring module 1 may comprise at least the waypoint coordinates, and may further comprise other data such as waypoint time values, waypoint heights, and the like.

The route data may comprise route data configured directly by a user. The acquiring module 1 may acquire the route data according to the configuration by the user. The route data may also comprise route data generated by the acquiring module 1 based on data such as GPS data, heights in the course of flight when the aerial vehicle is controlled to perform a certain flight task. In some embodiments, the route data may comprise route data associated with the aerial vehicle that is downloaded by the acquiring module 1 from another terminal or a network.

In some embodiments, the zoom ratio may be automatically determined according to distances between various waypoints in the route data. The displaying module 2 may display the whole route corresponding to the route data in the route display interface, so that the user does not need to perform an extra screen-scrolling operation.

In some embodiments, the zoom ratio may be automatically determined according to maximum distances between various waypoints in an X axis direction and a Y axis direction in a horizontal plane, respectively. The displaying module 2 may determine sizes of a screen area of the terminal required by the route display interface in the X axis and Y axis directions, so that when the route data is displayed in the route display interface, two waypoints with the largest distance in the X axis direction and two waypoints with the largest distance in the Y axis direction may be both displayed in the screen area corresponding to the route display interface, such that the user does not need to scroll the screen.

In some embodiments, the displaying module 2 may display the route corresponding to the aerial vehicle with the waypoints being connected by lines according to the time values of the waypoints.

The user may click on a certain waypoint displayed in the route display interface that needs to be edited, to invoke an edit window for the waypoint and complete the editing in the edit window. The updating module 3 may complete the editing and updating according to operating events for waypoints by different gestures of the user performed in the route display interface.

After the updating module 3 completes the updating, the displaying module 2 may display in real time the updated route data to the user in the route display interface.

According to the present disclosure, an interface for displaying a route may be automatically configured for a user, and a route edit function can be provided to the user. Thus, route information can be intuitively and completely displayed to the user. As a result, the user's time can be saved and the needs to automate and intelligentize route viewing and editing can be satisfied.

Figure 8:
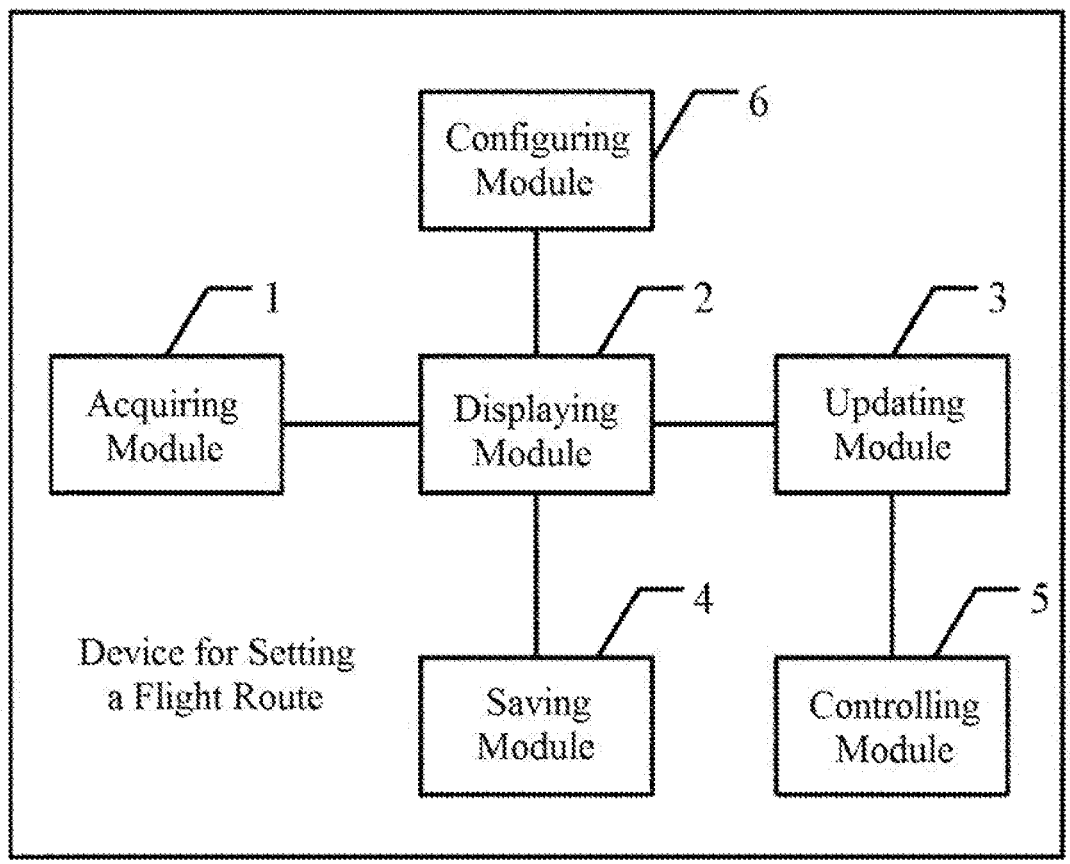
FIG. 8 is a structural schematic diagram of another device for setting a flight route in accordance with an embodiment of the present disclosure.

FIG. 8 is a structural schematic diagram of another device for setting a flight route in accordance with an embodiment of the present disclosure. The device in accordance with the present disclosure may be set in an intelligent terminal such as a smart phone, a tablet, an intelligent wearable apparatus, a computer, or the like. Specifically, the device may comprise the acquiring module 1, the displaying module 2, the updating module 3, and a saving module 4 configured to save the updated route data of the aerial vehicle. The displaying module 2 may be further configured to incorporate the updated route data of the aerial vehicle into a map to display to the user.

In some embodiments, the displaying module 2 may display the edited route data in a preset two-dimensional or three-dimensional map.

In some embodiments, as shown in FIG. 8, the device in accordance with the present disclosure may further comprise a controlling module 5 configured to, when a flight control operation is detected, control the aerial vehicle to fly automatically in accordance with time values, waypoint coordinates, and waypoint heights included in the updated route data.

The edited route data may be sent to a controller of the aerial vehicle by the controlling module 5 as triggered by the user clicking on one key. The controller may analyze the route data and generate a control instruction to control propulsion components of the aerial vehicle to complete a flight task on the route.

In some embodiments, as shown in FIG. 8, the device may further comprise a configuring module 6 configured to determine the waypoint coordinates in the route data and calculating maximum planar distances between the waypoints in the two directions in a planar coordinate system, and calculate a preset zoom ratio of the route display interface according to a screen coordinate of the current terminal and the maximum planar distances in the two directions, to complete the configuration of the zoom ratio of the route display interface.

Figure 9:
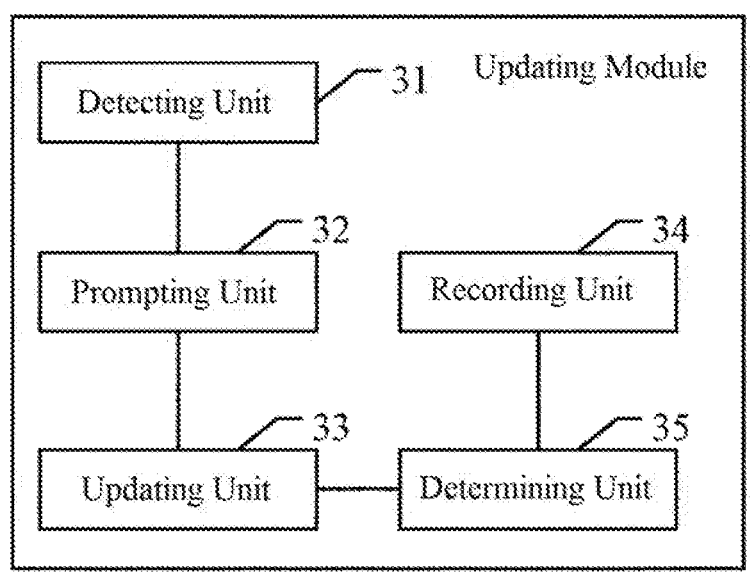
FIG. 9 is a structural schematic diagram of one of structures of a determining module in FIG. 8.

In some embodiments, as shown in FIG. 9, the updating module 3 may comprise a detecting unit 31, a prompting unit 32, and an updating unit 33. The detecting unit 31 is configured to detect an edit operation by the user and, if the edit operation instructs to update a waypoint selected by the edit operation to a target position, detect whether the target position is within a no-fly zone. The prompting unit 32 is configured to, if a detection result of the detecting unit 31 is yes, issue a prompt of forbidding to set. The updating unit 33 is configured to, if the detection result of the detecting unit 31 is no, reset the route displayed in the route display interface according to the edit operation.

In some embodiments, as shown in FIG. 9, the updating module 3 may comprise a recording unit 34 and a determining unit 35. The recording unit 34 is configured to, if the edit operation initiated by the user instructs to edit waypoint heights, record heights of the aerial vehicle when the aerial vehicle flies to corresponding waypoints. The determining unit 35 is configured to reset the route displayed in the route display interface using the recorded heights of various waypoints to obtain the updated route data of the aerial vehicle.

In some embodiments, the updating module 3 may only comprise a combination of the detecting unit 31, the prompting unit 32, and the updating unit 33, or only comprise a combination of the recording unit 34 and the determining unit 35, or may comprise both combinations.

Figure 10:
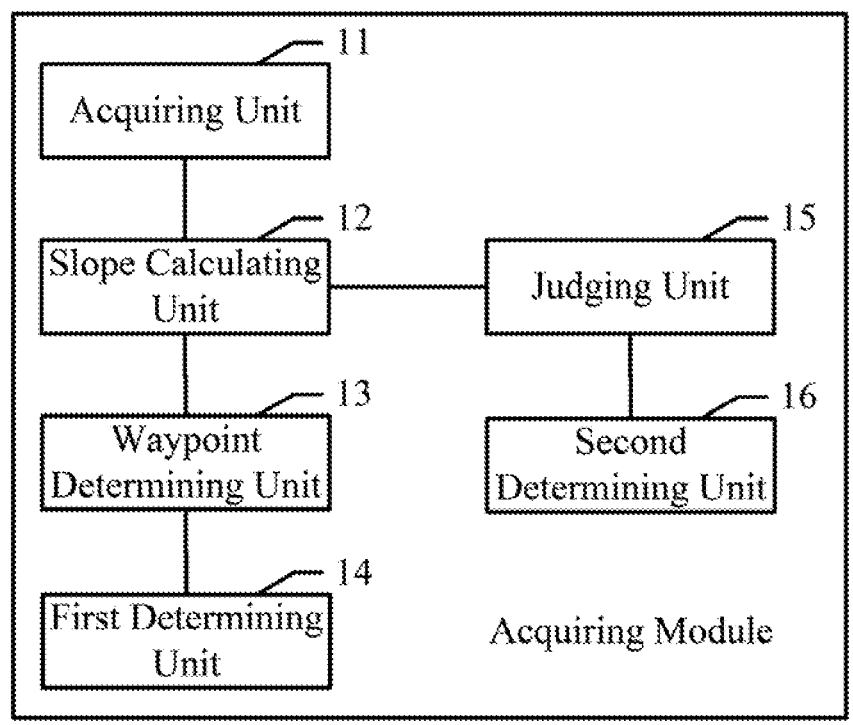
FIG. 10 is a structural schematic diagram of one of structures of an acquiring module in FIG. 8.

In some embodiments, as shown in FIG. 10, the acquiring module 1 may comprise an acquiring unit 11, a slope calculating unit 12, a waypoint determining unit 13, and a first determining unit 14. The acquiring unit 11 is configured to acquire a geometric figure drawn by the user on a planar map. The slope calculating unit 12 is configured to calculate slopes corresponding to various position points on the drawn geometric figure. The waypoint determining unit 13 is configured to determine various waypoints on the drawn geometric figure. In some embodiments, the determined waypoints may comprise a start point of the route and position points that have a corresponding slope greater than a preset slope threshold and a distance from a previous waypoint no less than a preset distance threshold. The first determining unit 14 is configured to obtain the route data according to coordinates of the determined waypoints on the planar map.

In some embodiments, as shown in FIG. 10, the acquiring module 1 may further comprise a judging unit 15 and a second determining unit 16. The judging unit 15 is configured to judge whether the drawn geometric figure is a straight line. The second determining unit 16 is configured to, when a judging result of the judging unit 15 is yes, determine a start point and an end point of the drawn straight line as waypoints on the route, and obtain the route data according to coordinates of the determined waypoints. The slope calculating unit 12 may be configured to, if the judging result of the judging unit 15 is no, calculate slopes corresponding to various position points on the drawn geometric figure.

In some embodiments, the acquiring module 1 may only comprise a combination of the acquiring unit 11, the slope calculating unit 12, the waypoint determining unit 13, and the first determining unit 14, or may further comprise the judging unit 15 and the second determining unit 16 in addition the above-noted combination.

In some embodiments, the route display interface may be a three-dimensional route display interface and the displaying module 2 may be configured to display a route of the aerial vehicle in the three-dimensional route display interface with preset waypoint heights according to waypoint coordinates in the route data. The waypoint heights may be preset according to altitudes of corresponding regions of the geometric figure drawn on the planar map. In some embodiments, the waypoint heights may be preset heights from the ground.

In some embodiments, the acquiring module 1 may be configured to acquire various waypoint coordinates, waypoint heights, and time values of the aerial vehicle in the course of fight as route data of the aerial vehicle.

It should be noted that, specific implementation of various modules and corresponding units of the device in accordance with the present disclosure may be similar to the methods described above with reference to FIG. 1 to FIG. 5.

According to the present disclosure, an interface for displaying a route may be automatically configured for a user, and a route edit function can be provided to the user. Thus, route information can be intuitively and completely displayed to the user. As a result, the user's time can be saved and the needs to automate and intelligentize route viewing and editing can be satisfied. Moreover, a three-dimensional route may be configured based on actual waypoint heights as needed. As such, a more accurate three-dimensional route configuration may be provided to the user.

Figure 11:
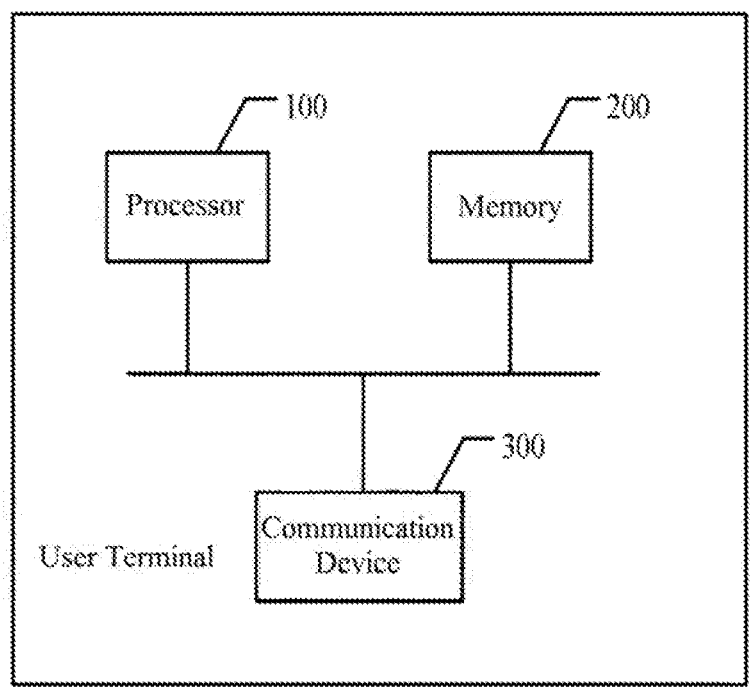
FIG. 11 is a structural schematic diagram of a user terminal in accordance with an embodiment of the present disclosure.

FIG. 11 is a structural schematic diagram of a user terminal in accordance with an embodiment of the present disclosure. The user terminal in accordance with the present disclosure may comprise a processor 100, a memory 200, and a communication device 300. The communication device 300 may be configured to communicate data with an external apparatus. The memory 200 may store programs for setting a flight route.

The processor 100 may be configured to acquire route data of an aerial vehicle by executing the programs for setting a flight route stored in the memory 200, display a route of the aerial vehicle in a route display interface that has been zoomed at a zoom ratio according to waypoint coordinates in the route data, and reset the route displayed in the route display interface according to an edit operation to obtain updated route data of the aerial vehicle.

In some embodiments, the processor 100, when configured to configure the zoom ratio for the route, may be specifically configured to determine the waypoint coordinates in the route data and calculate maximum planar distances between the waypoints in two directions in a planar coordinate system, respectively, and calculate a preset zoom ratio of the route display interface according to a screen coordinate of the terminal and the maximum planar distances in the two directions, to complete the configuration of the zoom ratio of the route display interface.

In some embodiments, the processor 100, when configured to reset the route displayed in the route display interface according to edit information corresponding to a received edit operation, may be specifically configured to detect the edit operation of a user, and, if the edit operation instructs to update a waypoint selected by the edit operation to a target position, detect whether the target position is within a no-fly zone. If yes, the processor 100 issues a prompt of forbidding to set and if no, the processor 100 resets the route displayed in the route display interface according to the edit operation.

In some embodiments, the processor 100, when configured to acquire the route data of the aerial vehicle, may be specifically configured to acquire a geometric figure drawn by the user on a planar map; calculate slopes corresponding to various position points on the drawn geometric figure, determine various waypoints on the drawn geometric figure, and obtain the route data according to coordinates of the determined waypoints on the planar map. In some embodiments, the determined waypoints may comprise a start point of the route and position points that have a corresponding slope greater than a preset slope threshold and a distance from a previous waypoint no less than a preset distance threshold.

In some embodiments, the processor 100 may be configured to, before calculating the slope values corresponding to the various position points on the drawn geometric figure, judge whether the drawn geometric figure is a straight line. If yes, the processor 100 may determine a start point and an end point of the drawn straight line as waypoints on the route and obtain the route data according to coordinates of the determined waypoints. If no, the processor 100 may perform the calculation of slopes corresponding to the various position points on the drawn geometric figure.

In some embodiments, the processor 100, when configured to display the route of the aerial vehicle in the configured route display interface according to the waypoint coordinates in the route data, may be specifically configured to display the route of the aerial vehicle in the three-dimensional route display interface with preset waypoint heights according to the waypoint coordinates in the route data. The waypoint heights may be preset according to altitudes of corresponding regions of the geometric figure drawn on the planar map. In some embodiments, the waypoint height values may be preset heights from the ground.

In some embodiments, the processor 100, when configured to reset the route displayed in the route display interface according to the edit operation to obtain updated route data of the aerial vehicle, may be specifically configured to, if the edit operation initiated by the user instructs to edit waypoint heights, record heights of the aerial vehicle when the aerial vehicle flies to corresponding waypoints, and reset the route displayed in the route display interface with the recorded heights of the various waypoints, to obtain the updated route data of the aerial vehicle.

In some embodiments, the processor 100, when configured in route view mode, may be configured to display the route in response to the user's operation. The processor 100's response to the user's operation may comprise performing a three-dimensional zooming on a route when the user performs a gesture of two-finger pinching, moving the route when the user performs a gesture of single-finger dragging on a central region, flipping the route when the user performs a gesture of single-finger dragging on a periphery region, or entering into an edit mode to perform an edit operation on a single waypoint when the user clicks on the single waypoint by a single finger.

In some embodiments, the edit operation responded by the processor 100 for the route displayed in the route display interface may comprise at least one of the followings: adjusting a distance of a waypoint in a direction facing the screen by two-finger pinching, moving a position of a waypoint up and down or left and right by a gesture of single-finger dragging, moving an unselected waypoint to a center of the screen for editing by single-finger clicking on the unselected waypoint, saving a previous editing by clicking a confirm button, or cancelling the previous editing by clicking a cancel button.

In some embodiments, the processor 100 may further be configured to save the updated route data of the aerial vehicle, and/or incorporate the updated route data of the aerial vehicle into a map to display to the user.

In some embodiments, the processor 100 may further be configured to, when a flight control operation is detected, control the aerial vehicle to fly automatically in accordance with time values, waypoint coordinates, and waypoint heights included in the updated route data.

In some embodiments, the processor 100, when configured to acquire the route data of the aerial vehicle, may be specifically configured to acquire various waypoint coordinates, waypoint heights, and time values of the aerial vehicle in the course of flight as the route data of the aerial vehicle.

It should be noted that, the specific implementation of the processor 100 in the user terminal in accordance with the present disclosure may be similar to the methods described above with reference to FIG. 1 to FIG. 5.

According to the present disclosure, an interface for displaying a route may be automatically configured for a user, and a route edit function can be provided to the user. Thus, route information can be intuitively and completely displayed to the user. As a result, the user's time can be saved and the needs to automate and intelligentize route viewing and editing can be satisfied. Moreover, a three-dimensional route may be configured based on actual waypoint heights as needed. As such, a more accurate three-dimensional route configuration may be provided to the user.

In the several embodiments provided by the present disclosure, it should be understood that, the disclosed related device and method may be implemented by other means. For example, the above-described device embodiments are merely schematic. For example, the division of the modules or units is merely a logic function division, and other division manners may be employed in actual practice. For example, more units or components may be combined or may be integrated into another system. Alternatively, some features may be omitted or not be performed. Additionally, couplings or direct couplings or communication connections between one and another as displayed or discussed may be indirect couplings or communication connections via some interfaces, apparatuses or units, or may be in electric, mechanical or other forms.

Units described as separate parts may or may not be separated physically. Components displayed as units may or may not be physical units, i.e., they may be located in one place, or may be distributed onto a plurality of network units. Some or all of the units may be selected in order to achieve the objects of the solutions of the embodiments according to the actual requirements.

Additionally, various functional units in various embodiments according to the present disclosure may be integrated into one processing unit, or may be physically individual. Two or more of various function units may be integrated into one unit. The above integrated unit may be implemented in a form of hardware or in a form of functional units of software.

The integrated unit if being implemented in a form of functional unit of software and being independent product for sale and use may be stored in a computer-readable storage medium. Based on such understandings, part or all of the technical solution may be embodied in a form of a software product. The software product may be stored in a storage medium, and comprise several instructions for causing a computer processor to execute some or all of the methods according to the present disclosure, such as one of the exemplary methods described above. The above-mentioned storage medium may comprise: a USB flash disk, a movable hard disc, a Read-Only Memory (ROM), a random access memory (RAM), a diskette or an optical disc, or various medium capable of storing program codes.

The foregoing disclosure is merely illustrative of the embodiments of the disclosure, and is not intended to limit the scope of the disclosure. Any equivalent structural or flow variations made on the basis of the description and the drawings of the disclosure, and their direct or indirect application to other relevant technical fields, shall fall into the scope of the disclosure.

What is claimed is:

1. A flight route setting method comprising:
    acquiring route data of an aerial vehicle, the route data comprising waypoint coordinates, waypoint time values, and waypoint heights of waypoints on a route;
    displaying the route of the aerial vehicle in a route display interface zoomed at a zoom ratio according to the waypoint coordinates; and
    resetting the route displayed in the route display interface according to an edit operation to obtain updated route data of the aerial vehicle,
    wherein the acquiring the route data of the aerial vehicle comprises:
        acquiring a geometric figure drawn on a planar map;
        determining whether the geometric figure is a straight line;
        in response to determining that the geometric figure is a straight line, determining a start point and an end point of the straight line as the waypoints on the route, and obtaining the route data according to coordinates of the start point and the end point;
        in response to determining that the geometric figure is not a straight line, calculating slopes corresponding to position points on the geometric figure; determining two or more of the position points on the geometric figure as the waypoints on the route; and obtaining the route data according to coordinates of the two or more of the position points, wherein the two or more of the position points comprise a start point of the geometric figure and a position point having a corresponding slope greater than a preset slope threshold and a distance to a previous position point no less than a preset distance threshold.

2. The method of claim 1, further comprising:
    configuring the zoom ratio, comprising:
        calculating a first maximum planar distance between the waypoints in a first direction in a planar coordinate system;
        calculating a second maximum planar distance between the waypoints in a second direction in the planar coordinate system; and
        calculating the zoom ratio according to a screen coordinate of a screen showing the route display interface, and the first and second maximum planar distances.

3. The method of claim 1, wherein the resetting the route comprises:
    detecting the edit operation;

detecting, if the edit operation instructs to update one of the waypoints to a target position, whether the target position is within a no-fly zone;
in response to detecting that the target position is within a no-fly zone, issuing a prompt of forbidding to set; and
in response to detecting that the target position is not within a no-fly zone, resetting the route displayed in the route display interface according to the edit operation.

4. The method of claim 1, wherein:
the route display interface is a three-dimensional route display interface, and
displaying the route comprises displaying the route in the three-dimensional route display interface with preset waypoint heights of the waypoints according to the waypoint coordinates, the preset waypoint heights being preset according to altitudes of corresponding regions on the route or preset height values from a ground.

5. The method of claim 1, wherein the resetting the route comprises, if the edit operation instructs to perform a waypoint height editing:
recording heights of the aerial vehicle when the aerial vehicle flies to the waypoints; and
resetting the route displayed in the route display interface using the recorded heights of the waypoints to obtain the updated route data of the aerial vehicle.

6. The method of claim 1, further comprising:
controlling a display of the route in response to a user operation, comprising one of:
performing a three-dimensional zooming operation on the route in response to a gesture of two-finger pinching;
moving the route in response to a gesture of single-finger dragging on a center of the route display interface;
flipping the route in response to a gesture of single-finger dragging on a periphery region of the route display interface; and
entering into an edit mode to edit a waypoint in response to a single-finger click on the waypoint.

7. The method of claim 1, wherein the edit operation comprises at least one of:
adjusting a distance of a selected waypoint in a direction facing a screen by two-finger pinching,
moving a position of the selected waypoint up and down or left and right by a gesture of singer-finger dragging,
moving an unselected waypoint to a center of the route display interface for editing by single-finger clicking on the unselected waypoint,
saving a previous editing by clicking on a confirm button, or
cancelling the previous editing by clicking on a cancel button.

8. The method of claim 1, further comprising at least one of:
saving the updated route data of the aerial vehicle; or
incorporating the updated route data of the aerial vehicle into a map for displaying.

9. The method of claim 1, further comprising:
controlling, when a flight control operation is detected, the aerial vehicle to fly automatically in accordance with the updated route data.

10. A flight route setting device comprising:
a processor; and
a memory coupled to the processor, the memory storing instructions that, when executed by the processor, cause the processor to:
acquire route data of an aerial vehicle, the route data comprising waypoint coordinates, waypoint time values, and waypoint heights of waypoints on a route,
display the route of the aerial vehicle in a route display interface zoomed at a zoom ratio according to the waypoint coordinates, and
reset the route displayed in the route display interface according to an edit operation to obtain updated route data of the aerial vehicle,
wherein, to acquire the route date, the instructions further cause the processor to:
acquire a geometric figure drawn on a planar map;
determine whether the geometric figure is a straight line;
in response to that the geometric figure is a straight line, determine a start point and an end point of the straight line as the waypoints on the route, and obtain the route data according to coordinates of the start point and the end point;
in response to that the geometric figure is not a straight line, calculate slopes corresponding to position points on the geometric figure; determine two or more of the position points on the geometric figure as the waypoints on the route; and obtain the route data according to coordinates of the two or more of the position points, wherein the two or more of the position points comprise a start point of the geometric figure and a position point having a corresponding slope greater than a preset slope threshold and a distance to a previous position point no less than a preset distance threshold.

11. The device of claim 10, wherein the instructions further cause the processor to:
calculate a first maximum planar distance between the waypoints in a first direction in a planar coordinate system,
calculate a second maximum planar distance between the waypoints in a second direction in the planar coordinate system, and
calculate the zoom ratio according to a screen coordinate of a screen showing the route display interface, and the first and second maximum planar distances.

12. The device of claim 10, wherein the instructions further cause the processor to:
detect the edit operation and, if the edit operation instructs to update one of the waypoints to a target position, detect whether the target position is within a no-fly zone,
issue, in response to that the target position is within the no-fly zone, a prompt of forbidding to set, and
reset, in response to that the target position is not within the no-fly zone, the route displayed in the route display interface according to the edit operation.

13. The device of claim 10, wherein:
the route display interface is a three-dimensional route display interface, and
the instructions further cause the processor to display the route in the three-dimensional route display interface with preset waypoint heights of the waypoints according to the waypoint coordinates, the preset waypoint heights being preset according to altitudes of corresponding regions on the route or preset heights from a ground.

14. The device of claim 10, wherein the instructions further cause the processor to:

record, if the edit operation instructs to perform a waypoint height editing, heights of the aerial vehicle when the aerial vehicle flies to the waypoints, and reset the route displayed in the route display interface using the recorded heights of the waypoints to obtain the updated route data of the aerial vehicle.

15. The device of claim 10, wherein the instructions further cause the processor to:

save the updated route data of the aerial vehicle, and incorporate the updated route data of the aerial vehicle into a map for displaying.

16. The device of claim 10, wherein the instructions further cause the processor to:

control, when a flight control operation is detected, the aerial vehicle to fly automatically in accordance with the updated route data.

\* \* \* \* \*